June 3, 1952 — V. P. HEAD — 2,598,910
METER FOR DETERMINING FLOW RATE AND/OR VISCOSITY OF FLUIDS
Filed June 4, 1947
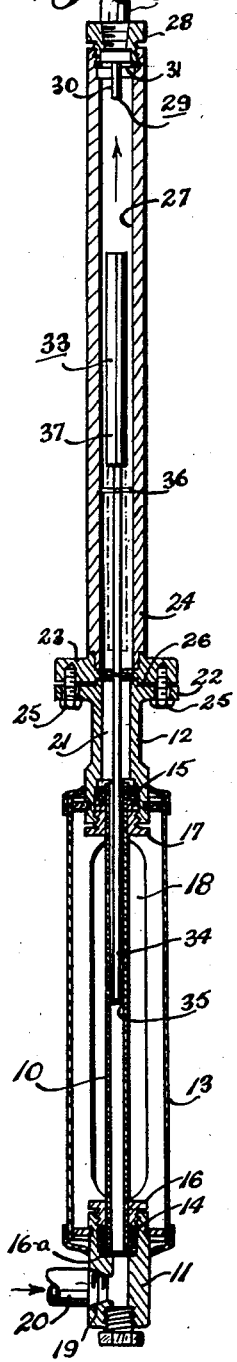
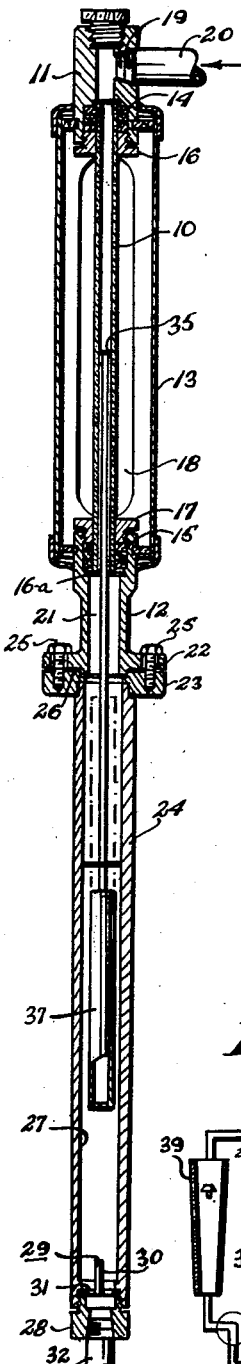
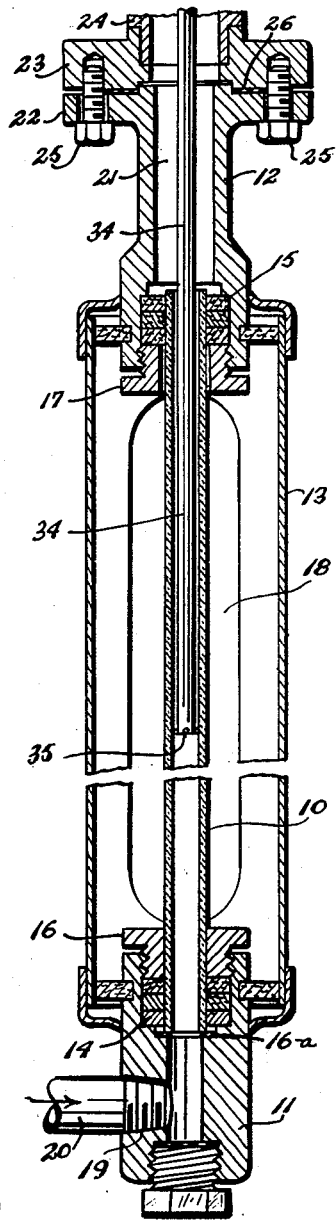
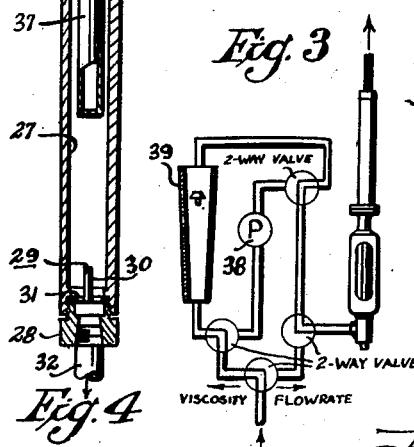
INVENTOR.
Victor P. Head
ATTORNEY

UNITED STATES PATENT OFFICE 2,598,910

METER FOR DETERMINING FLOW RATE AND/OR VISCOSITY OF FLUIDS

Victor P. Head, Lacey Park, Pa., assignor to Fischer & Porter Company, Hatboro, Pa., a corporation of Pennsylvania Application June 4, 1947, Serial No. 752,303

3 Claims. (Cl. 73—56)

The present invention relates to measurement of the flow-rate or viscosity of a moving fluid and it relates more particularly to the measurement of the flow-rate of a fluid having a known viscosity, when the viscosity is relatively high, or to the measurement of the viscosity of a fluid flowing at a known or controlled flow-rate.

An object of the present invention is to provide a metering device capable of measuring the flow-rate of a fluid of known viscosity when the viscosity is relatively high. Another object of the present invention is to provide an instrument for measuring the flow-rate of a fluid under conditions of viscous flow.

A further object of the present invention is to provide an instrument for measuring the viscosity of a fluid which is flowing at a known or controlled flow-rate.

Other objects and advantages of the present invention are apparent in the following detailed description, appended claims and accompanying drawings.

It has been conventional, for many years, to employ an instrument of the type generally referred to as "rotameter" for measuring the flow-rate of a moving fluid. In their usual form, rotameters comprise a vertical metering tube which is tapered or fluted so as to provide upwardly-increasing cross-sectional area available for upward flow of fluid therethrough. A metering "float" is conventionally disposed within the metering tube and includes a vertically-extending body portion and a transversely-enlarged head portion which provides an annular clearance with the metering tube so as to give an upwardly-increasing infinitely-variable fluid by-pass. As is well known in the art, the "float" (which is usually heavier than the fluid so that it rests at the bottom of the tube when there is no fluid-flow) rises within the tube with increase in flow-rate so that the position of the flow-constricting head portion within the tube is a measure of the flow-rate.

While conventional rotameters of the type described hereinabove have operated with excellent results in the range of relatively high flow-rates (wherein the flow of the fluid is opposed by its inertia, as it accelerates or experiences change of momentum in passing through a region of decreasing flow-area, such as is provided by the flow-constricting head portion of the float), they have been found somewhat inadequate when used with extremely low flow-rates such as fall within the category of viscous flow (wherein the flow is opposed to a substantial extent by the viscous shear or friction of the fluid and not entirely by the inertia of the fluid).

According to the present invention, there has been developed for the first time a metering instrument resembling a conventional rotameter in operation in that indication is achieved by the variable position of a "float," but providing more or less for freedom from the effects of inertia upon the flow so that accurate prediction of the flow (or viscosity) becomes possible at a variety of viscosities and densities (or flow rates and densities) merely by reference to a single calibration, or even without calibration, by reference to the now known laws of "pure" viscous flow (in which, ideally, inertia of the fluid would have no effect on the character of the flow) even at such relatively large flow rates and low viscosities as would introduce large and unavoidable inertia effects during viscous flow in a conventional rotameter.

Generally speaking, the present invention comprehends an instrument having an elongated vertical metering chamber, which has the same cross-sectional configuration throughout its length and a metering float having an elongated flow-constricting portion which fits within the metering tube with relatively small peripheral clearance (the flow-constricting portion being uniform in cross-sectional configuration throughout its length); the flow-constricting portion extending somewhat beyond the upper (or lower) end of the metering tube and being raised (or lowered) relative to the tube upon increase in the flow-rate of fluid passing upward (or downward) through the tube, thereby to move the flow-constricting portion so that a greater part is above (or below) the metering tube. Where the fluid has a known viscosity, the position of the metering float relative to the tube will be an indication of the flow-rate and, where the viscosity is constant, the metering tube can be calibrated so that the flow-rate can be read off directly from the position of the float relative to the tube.

Where, on the other hand, the fluid is moving at a known or controlled-rate (for example, when a positive-displacement flow-rate indicator or a positive-displacement pump or a viscosity-immune rotameter is utilized to indicate a constant flow-rate of predetermined value), the position of the metering float relative to the tube is an indication of the viscosity of the fluid.

Thus, the novel metering device of the present invention can be used, optionally, either as a flowmeter or as a viscosimeter.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a view partly in vertical cross-section and partly in elevation, showing one embodiment of the present invention.

Figure 2 represents a view, on an enlarged scale, showing the metering tube and the associated flow-constricting portion of the float of the embodiment of Figure 1.

Figure 3 represents a schematic view showing one form of piping arrangement which can be employed to permit use of the novel meter of the present invention, either as a flowmeter or as a viscosimeter.

Figure 4 represents a view generally similar to that of Figure 1, but showing another embodiment wherein a down-flow metering tube and a buoyant float are employed.

In one embodiment of the present invention shown generally in Figure 1, I may provide an elongated cylindrical metering tube 10 which is vertically disposed intermediate the lower and upper "heads" or "fittings" 11 and 12 respectively of a frame or housing 13.

Sealing gaskets 14 and 15 are disposed within stuffing-boxes formed in the heads 11 and 12 respectively and surround the ends of the metering tube 10. A washer 16-a may be disposed in the lower stuffing-box so as to support the lower end of the tube 10. Stuffing-glands 16 and 17 are adjustably mounted in operative relationship to the stuffing-boxes whereby they can be tightened against the gaskets to provide fluid-tight seals intermediate the ends of the tube 10 and the heads 11 and 12, in conventional manner.

The housing 13 may also be provided with one or more windows 18 through which the metering tube 10 (which may be of glass or other transparent material) may be observed.

The lower head 11 may be provided with a threaded inlet opening 19 which communicates with the lower end of the metering tube 10 and which is adapted to connect with a horizontal inlet pipe-line 20.

The upper head 12, which is provided with a central vertical conduit 21, has a flange 22 formed at its upper end whereby it can be detachably secured to a corresponding flange 23 formed at the lower end of a vertical extension chamber 24; bolts 25 being adapted to tighten the flanges 22 and 23 against an intervening gasket 26 so as to provide a fluid-tight seal.

The extension chamber 24 is provided with a cylindrical vertically-extending inner bore 27 which is substantially larger in horizontal dimension than the inner bore of the metering tube 10.

A threaded outlet fitting 28 is removably mounted at the upper end of the extension chamber 24, in fluid-tight relationship thereto. An upper float-stop 29 is held in position at the upper end of the extension chamber 24 by the outlet fitting 28; the float-stop including a downwardly-extending portion 30 and a horizontally-extending spider-portion 31. The outlet fitting is connected to a vertical outlet pipe-line 32.

It is apparent that fluid will pass from the inlet pipe-line 20 upward through the lower head 11, the metering tube 10, the upper head 12, the extension chamber 24 and the outlet fitting 28 to leave by the pipe-line 32.

A metering float, indicated generally by the reference character 33, includes an elongated smooth uniform and preferably cylindrical flow-constricting portion 34 which extends within the metering tube 10 but is longer than said tube so that its upper end of the portion 34 always extends beyond the upper end of the tube 10.

The flow-constricting portion 34 is slightly smaller in diameter than the metering tube 10 so that an annular clearance of uniform cross-section and small radial dimension is provided therebetween. A plurality of horizontally-extending centering-pins 35 are provided at the lower end of the portion 34; the pins 35 contacting the tube 10 to center the portion 34 relative thereto.

A second set of centering-pins 36 is provided adjacent the upper end of the portion 34; the pins 36 contacting the bore 27 of the extension chamber 24 whereby the portion 34 is maintained in outer vertical position, without wobbling or tilting, in spaced relationship to the tube 10 and the bore 27.

A weight-giving or gravity-determining body portion 37 is mounted at the upper end of the flow-constricting portion 34. The body portion 37 may be generally cylindrical with a diameter larger than that of the flow-constricting portion 34. However, the body portion 37 is substantially spaced from the bore 27 so that it does not provide any appreciable flow-constriction.

Upward movement of the float 33 is limited by the upper float-stop 29 (with which the upper end of the body portion 37 makes contact) while downward movement of the metering float is limited by the upper centering pins 36 which contact the upper end of the head 12.

The various parts are so dimensioned that the lower end of the flow-constricting portion 34 cannot rise out of the upper end of the metering tube 10 and cannot descend to the bottom of the metering tube 10.

When there is no flow of fluid upward through the metering tube 10, the metering float 33 is in the lowermost position shown in dash-dot lines in Figure 1 (wherein the centering-pins 36 contact the upper end of the head 12).

Increase in rate-of-flow of fluid upward through the metering tube 10 will raise the float 33, for example, to the position shown in solid lines in Figure 1.

As mentioned hereinabove, the lifting force necessary to overcome the attraction of gravity (the float 33 being heavier than the fluid being metered) is generated by the viscous shear or friction of the fluid upon the flow-constricting portion 34 as it moves upward through the annular orifice intermediate the portion 34 and the tube 10.

It is apparent that the extent of the lifting force generated upon the portion 34 is dependent upon three factors, namely the viscosity of the fluid (the greater the viscosity, the greater the lifting force), rate-of-flow (the greater the rate-of-flow, the greater the lifting force), and the extent of the surface area of the portion 34 which is in flow-constricting relationship to the tube 10 (the greater the area, the greater the lifting force).

It is also apparent that, with the float in any given elevated position relative to the metering tube 10, an increase in rate-of-flow will increase the lifting force so as to raise the float. However, when the float is so raised, the effective flow-constricting area of the portion 34 is gradually reduced to a point at which the total lifting force generated upon the float 33 at the increased flow-rate falls to the original value at which it just counter-balances the weight of the float so that the float stops moving and reaches equilibrium at a new further-elevated position relative to the tube 10.

Similarly, if the viscosity of the moving fluid increases, the lifting force of the float 33 will be correspondingly increased to result in an upward movement of the float to a new point of equilibrium at which the effective flow-constricting area of the portion 34 is correspondingly reduced.

It follows, therefore, that if the viscosity of the fluid is known, it is a simple enough matter to calculate the flow-rate from the position of the float and, conversely, if the flow-rate is known, it is possible to calculate the viscosity from the position of the float.

I have found that the distance from the lower end of the flow-constricting portion of the float to the upper end of the metering tube is inversely proportional to the product of the flow-rate and the viscosity of the fluid.

Thus, if either the viscosity or the flow-rate is known, the other variable can be calculated from the aforesaid distance.

If the flow-rate is constant, a viscosity scale can be provided, either etched directly on the tube or on a separate member mounted in juxtaposition to the tube. Conversely, if the viscosity is constant, a flow-rate scale can be provided.

If the viscosity is constant, variations in the position of the float indicate variations in the rate-of-flow of the fluid and it is possible to calibrate the metering tube so that the flow-rate can be read off directly from the tube through the windows 18 in the frame or housing 13.

With the novel construction of the present invention, it is possible to obtain accurate flow-rate measurements, not only of fluids which follow Newton's law, but also of so-called "non-newtonian" fluids such as are commonly encountered in the petroleum and food-processing industries; as for example, mayonnaise, tomato catsup, road asphalt and other suspensions and plastics.

On the other hand, by maintaining the flow-rate constant, the instrument can be made to function as a viscosimeter; variations in the position of the metering float 33 indicating corresponding variations in viscosity.

The flow-rate can be maintained constant by employing a positive displacement pump (for example the conventional constant-speed gear pump 38 shown in Figure 3) or by employing a rotameter 39 utilizing a viscosity-immune float of the type disclosed in Fischer U. S. Patent 2,350,343, as also indicated in Figure 3, in conjunction with any conventional automatic or manually operated flow-control valve.

It is evident that, instead of using direct readings from a transparent metering tube, it is possible to determine the position of the metering float in other ways; as for example, by providing a transparent window in the extension chamber 24 (in a manner analogous to that disclosed in Brewer U. S. Patent 2,388,672) or by making the body portion 37 the armature of a remote-indicating impedance circuit (in a manner analogous to that disclosed in Brewer U. S. Patent 2,414,086).

In Figure 4 there is shown another embodiment of the present invention which generally resembles the embodiment of Figure 1, as described hereinabove, except that the metering tube 10 is now adapted for downward flow of fluid; the inlet head 11 now being on top and the outlet head 12 now being at the bottom of the tube 10. In this embodiment, the extension chamber 24 communicates with the lower end of the tube 10.

In the embodiment of Figure 4, the body portion 37 (instead of being a weight-giving member which makes the overall density of the float greater than that of the fluid) is now a buoyancy member (for example, by being made hollow and by being evacuated) so that the over-all density of the float is less than that of the fluid being metered, whereby the float remains in uppermost position, as shown in dash-dot lines in Figure 4 when there is no fluid flow and whereby the float is forced downward relative to the metering tube as the flow-rate increases.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, I claim as new and desire to protect by Letters Patent:

1. A device of the character described comprising a vertical metering tube having a cylindrical inner bore of relatively small diameter and adapted for flow of fluid therethrough, a generally cylindrical extension chamber of relatively large diameter communicating in axial alignment with the outlet end of said metering tube, and a metering float having a flow-constricting smooth cylindrical rod-like portion disposed in part within said metering tube but extending beyond the outlet end thereof and into said extension chamber, said cylindrical portion being relatively slightly radially spaced from said metering tube and providing across said portion and into said extension chamber a fluid passageway of uniform relatively thin annular cross-section, said float having a gravity-determining portion mounted at the end of said flow-constricting portion and disposed at all times within said extension chamber comprising a cylindrical body of larger diameter than the inner bore of the metering tube and relatively widely spaced from the inner wall of said extension chamber so as to provide a fluid passageway of relatively wide annular cross-section, said float being adapted to move in the direction of fluid flowing through said tube and chamber upon increase either in flow-rate or in viscosity of the fluid during said flow, and said movement being substantially unaffected by flow of fluid through said passageway of relatively wide annular cross-section.

2. A device of the character described comprising a vertical metering tube having a cylindrical inner bore of relatively small diameter and adapted for flow of fluid from a lower inlet to an outlet at the upper end thereof, a generally cylindrical extension chamber of relatively large diameter communicating in axial alignment with said outlet at the upper end of said metering tube, and a metering float having a flow-constricting smooth cylindrical rod-like portion disposed in part within said metering tube but extending up through said outlet and into said extension chamber, said cylindrical portion being relatively slightly radially spaced from said metering tube and providing across said portion and into said extension chamber a fluid passageway of uniform relatively thin annular cross-section, said float having a gravity-determining portion mounted at the upper end of said flow-constricting portion and disposed at all times within said extension chamber comprising a cylindrical body of larger diameter than the inner bore of the metering tube and relatively widely spaced from the inner wall of said extension chamber so as to provide a fluid passageway of relatively wide annular cross-section, said float being adapted to move upwardly with fluid flowing through said tube and chamber upon increase either in flow-rate or in viscosity of the fluid during said flow, and said movement being substantially unaffected by flow of fluid through said passageway of relatively wide annular cross-section.

3. A device of the character described comprising a vertical metering tube having a cylindrical inner bore of relatively small diameter and adapted for flow of fluid from an upper inlet to an outlet at the lower end thereof, a generally cylindrical extension chamber of relatively large diameter communicating in axial alignment with said outlet at the lower end of said metering tube, and a metering float having a flow-constricting smooth cylindrical rod-like portion disposed in part within said metering tube but extending down through said outlet and into said extension chamber, said cylindrical portion being relatively slightly radially spaced from said metering tube and providing across said portion and into said extension chamber a fluid passageway of uniform relatively thin annular cross-section, said float having a gravity-determining portion mounted at the lower end of said flow-constricting portion and disposed at all times within said extension chamber comprising a cylindrical body of larger diameter than the inner bore of the metering tube and relatively widely spaced from the inner wall of said extension chamber so as to provide a fluid passageway of relatively wide annular cross-section, said float being adapted to move downwardly with fluid flowing through said tube and chamber upon increase either in flow-rate or in viscosity of the fluid during said flow, and said movement being substantially unaffected by flow of fluid through said passageway of relatively wide annular cross-section.

VICTOR P. HEAD.

REFERENCES CITED

The following references are of record in the file of this patent:

UNITED STATES PATENTS

| Number | Name | Date |
| --- | --- | --- |
| 2,020,588 | Stuart | Nov. 12, 1935 |
| 2,262,807 | Larner | Nov. 18, 1941 |

FOREIGN PATENTS

| Number | Country | Date |
| --- | --- | --- |
| 553,664 | Germany | June 29, 1932 |